United States Patent [19]

Matono et al.

[11] Patent Number: 4,707,732
[45] Date of Patent: Nov. 17, 1987

[54] SEPARATING CIRCUIT OF LUMINANCE AND CHROMINANCE SIGNALS FOR TV RECEIVER SELECTING BETWEEN THREE THREE LINE COMB FILTERS

[75] Inventors: Takaaki Matono; Toshinori Murata; Toshiyuki Kurita; Isao Nakagawa, all of Yokohama, Japan

[73] Assignee: Hitachi, Ltd., Tokyo, Japan

[21] Appl. No.: 918,037

[22] Filed: Oct. 14, 1986

[30] Foreign Application Priority Data

Oct. 14, 1985 [JP] Japan ................................ 60-226872

[51] Int. Cl.$^4$ ............................................. H04N 9/78
[52] U.S. Cl. ..................................................... 358/31
[58] Field of Search ........................................... 358/31

[56] References Cited

U.S. PATENT DOCUMENTS 4,050,084  9/1977  Rossi ..................................... 358/31
4,178,609 12/1979  Beutel ................................... 358/31

FOREIGN PATENT DOCUMENTS 151592   8/1984  Japan ..................................... 358/31
226292  11/1985  Japan ..................................... 358/31
2054313  2/1981  United Kingdom .................... 358/31

Primary Examiner—John W. Shepperd
Attorney, Agent, or Firm—Antonelli, Terry & Wands

[57] ABSTRACT

A circuit for separating a luminance signal and a chrominance signal having the first, second, third, and fourth 1H delay lines each connected in series, a first comb filter including the first and second 1H delay lines, a second comb filter including the second and third 1H delay lines, a third comb filter including the third and fourth 1H delay lines, a first subtraction circuit for achieving a subtraction on an input signal to the first 1H delay line and an output signal from the second 1H delay line, a second subtraction circuit for achieving a subtraction on an input signal to the second 1H delay line and an output signal from the third 1H delay line, a third subtraction circuit for achieving a subtraction on an input signal to the third 1H delay line and an output signal from the fourth 1H delay line, and a minimum value detecting circuit connected to the first, second, and third subtraction circuits for detecting the minimum value from the subtraction results. This circuit selects by use of a switch an output signal from the comb filter for which the minimum subtraction result is detected by the minimum value detecting circuit and then outputs the selected signal. This circuit can appropriately separate the luminance and chrominance signals even in a case where the video signal includes a contour section.

9 Claims, 10 Drawing Figures

SEPARATING CIRCUIT OF LUMINANCE AND CHROMINANCE SIGNALS FOR TV RECEIVER SELECTING BETWEEN THREE THREE LINE COMB FILTERS

BACKGROUND OF THE INVENTION

1. Field of the Invention

The present invention relates to a circuit of a color TV receiver for separating a luminance (Y) signal and a chrominance (C) signal from a composite video signal and for outputting the separated signals, and in particular, to a circuit for separating the luminance and chrominance signals by use of a comb filter which can properly separate the Y and C signals even in a contour section of a raster pattern scanned on a face plate of a picture tube of the color TV receiver.

2. Description of the Prior Art

Conventionally, in the color TV signals of the NTSC system, the band containing the signals is compressed by interleaving the chrominance (C) signal in spectral spaces existing in a high-frequency region of the luminance (Y) signal. The TV receiver must separate the Y and C signals from the received color TV signal. As a circuit for separating the Y and C signals, there have been known a circuit utilizing a low-pass filter and a high-pass filter and circuit using a comb filter having a scanning line memory.

FIG. 7 is a block diagram showing a conventional circuit for separating the Y and C signals by use of a comb filter.

In general, for the TV signals, there exists a correlation between the adjacent scanning lines of the scanned raster; moreover, the phase of the chrominance signal in the NTSC system is inverted for each horizontal scanning line. The circuit shown in FIG. 7 performs the separation of the Y and C signals by use of these characteristics.

FIG. 8 is a graph illustrating signal waveforms at the respective sections of the circuit shown in FIG. 7.

Referring to FIGS. 7-8, the circuit operation will be described. For the composite video signal inputted from terminal 1, when the signal of line 1+1 is on an output line 301 of a 1H delay line 3, the signal of line 1 is on an output line 202 of a 1H delay line 2, and the signal of line 1−1 is on an input line 201 of a 1H delay line 2.

The signals on the respective lines are multiplied by $-\frac{1}{4}$, $\frac{1}{2}$, and $-\frac{1}{4}$ in multipliers 4, 5, and 6, respectively. FIG. 8 (B) shows the resultant signals.

The minus sign for the multiplication means the phase inversion.

Next, the signals outputted from the multipliers 4-6 are added by an adder 7 and the resultant signal is fed to a band-pass filter 8 to remove the direct current (DC) component. As a result, the C signal of the video signal on the line 1 is extracted as shown in FIG. 8 (C). On the other hand, the subtractor 9 is a circuit to remove the C signal extracted from the video signal on the line 1. At an output terminal 11 of the subtractor 9, only the Y signal is attained as shown in FIG. 8 (D).

As described above, the circuit for separating the Y and C signals by use of the conventional comb filter obtains the necessary signals based on the correlation between the adjacent scanning lines on the raster of the screen. In a case where the contour section of an image is configured by lateral lines and inclined lines for which the correlation is weak in the vertical direction, the phase of the chrominance signal is not inverted between the adjacent scanning lines. In this case, therefore, the sufficient function to separate the Y and C signals cannot be developed and hence disturbance such as the cross color and dot crawl may take place.

The disturbance will be described with reference to FIGS. 9-10.

FIG. 9 is a diagram showing the contour section configured by lateral lines in which as indicated by a dotted line S, the color is changed between the lines 1 and 1+1 so as to form the contour section. Consequently, the phase of the chrominance signal should be inverted between the lines 1 and 1+1; however, the phase is not changed in this case and the complementary relationship exists between the associated colors.

As a result, through the completely same steps as those described with reference to FIGS. 7-8, the C and Y signals of the video signal on the line 1 are separated. However, the amplitude of the C signal becomes half that of FIG. 8, namely, another half thereof leaks into the Y signal, which causes so-called dot disturbance.

FIG. 10 is a diagram showing a contour section formed by inclined lines in which the phase and thus the color changes at the location indicated by a dotted line S, thereby forming the contour section. Also in this case, the C signal cannot be reproduced or separated with a high fidelity in the contour section and a portion of C signal is also mixed with the Y signal.

As described above, in the conventional Y and C signal separation circuit using the comb filter, the Y and C signals cannot be completely separated in the contour section configured by lateral lines or inclined lines, which leads to a problem that disadvantages such as the dot disturbance take place and thus the resolution of the displayed image is deteriorated.

SUMMARY OF THE INVENTION

It is therefore an object of the present invention to provide a signal separation circuit which is capable of preferably separating the luminance and chrominance signals also from the video signals associated with a contour section formed by lateral and inclined lines.

According to the present invention, there is provided a signal separation circuit having four delay elements each being connected in series which are used to configure three comb filters for generating three signals, respectively each being different in time by one horizontal scanning period.

The circuit further includes three subtraction circuits for detecting difference signals between a plurality of signals obtained by the four delay elements and a minimum value detecting circuit for detecting the minimum value among the resultant values obtained from the subtraction circuits. The subtraction circuits and the minimum value detecting circuit are used to detect a video signal not including a contour section, and then the signal including a contour section is replaced with the obtained signal to be outputted.

DETAILED DESCRIPTION OF THE PREFERRED EMBODIMENTS

Figure 1:
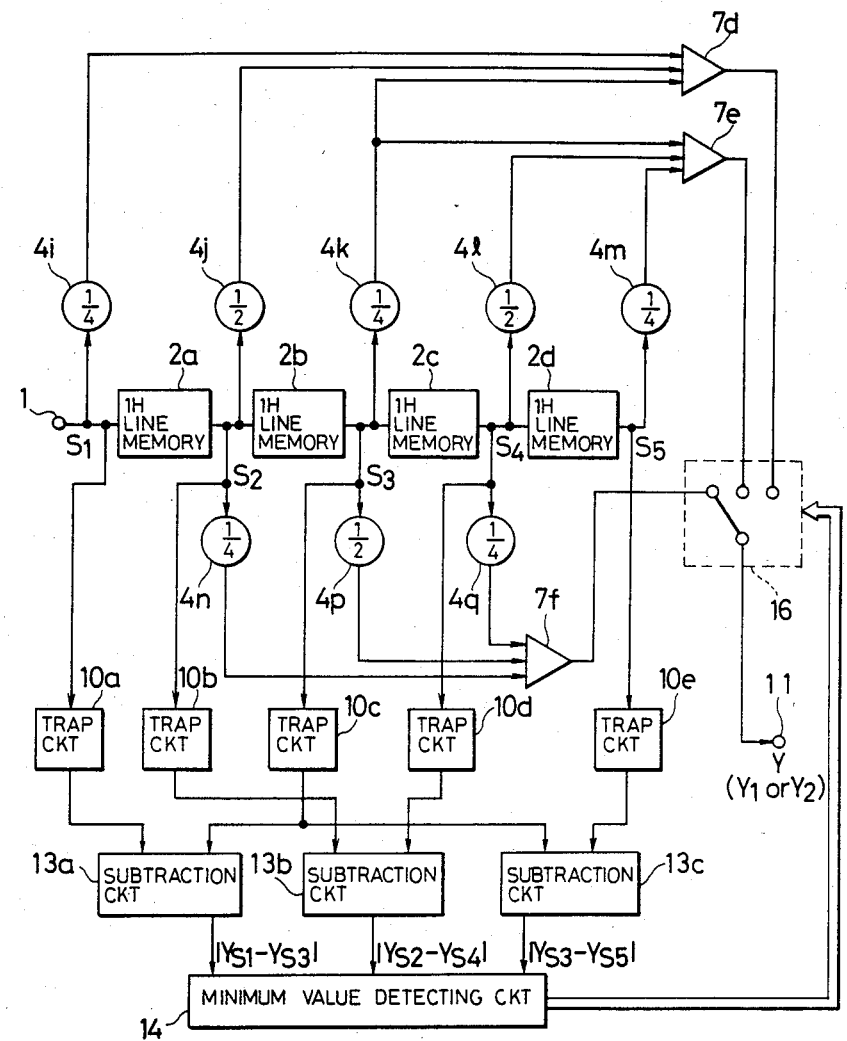
FIG. 1 is a block diagram showing a luminance signal separation circuit contained in the circuit for separating the luminance and chrominance signals according to the present invention.

FIG. 1 is a block diagram illustrating a circuit for separating the luminance signal included in the circuit for separating the luminance and chrominance signals according to the present invention.

This circuit basically comprises a first 2H (H = horizontal scanning period) type comb filter including 1H line memory units $2a-2b$, a second 2H type comb filter including 1H delay line memory units $2b-2c$, and a third 2H type comb filter including 1H delay line memory units $2c-2d$. The strength and weakness of the correlation between luminance signals is judged by trap circuits $10a-10e$ each having a trap frequency of 3.58 MHz and subtraction circuits $13a-13c$ so that one of the outputs from the three comb filters is selected by a switch 16. The line memory units $2a-2d$ are each comprise a semiconductor memory.

Figure 2:
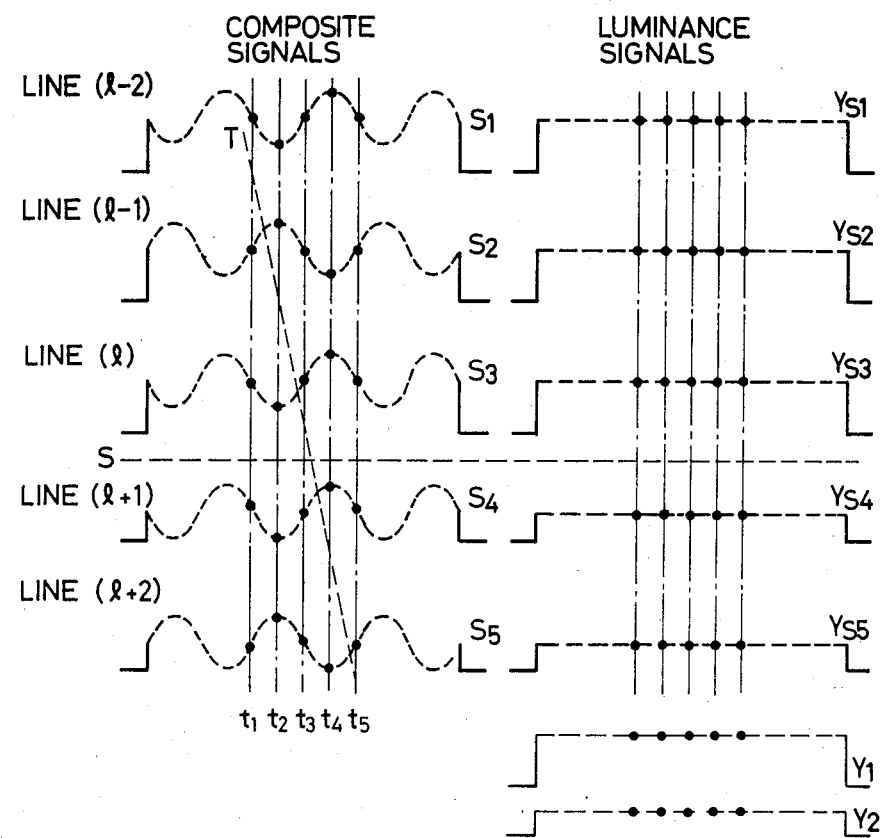
FIG. 2 is a schematic diagram illustrating signals of the circuit shown in FIG. 1.

FIG. 2 is a schematic diagram demonstrating signals at the respective sections of the circuit shown in FIG. 1. In this diagram, signals $S_1-S_5$ indicate composite video signals associated with lines $1-2$ to $1+2$, respectively, which are sampled and inputted to terminal 1. Solid dots indicate the sampling points. A dotted line S denotes a contour section of an image. At the contour section S, the color and luminance of the image are changed. In FIG. 2, the signals $S_1-S_5$ are shown in an analog fashion; however, digital signals are actually used.

Assume that a luminance signal for the line 1 is extracted by use of this circuit. Since a contour section S exists, luminance signals $Y_{S1}-Y_{S3}$ associated with the lines $1-2$ to 1 become almost the same. This is also the case with luminance signals $Y_{S4}$ and $Y_{S5}$ related to lines $1+1$ and $1+2$. The luminance signal changes between lines 1 and $1+1$. When the chrominance signal component is removed from the composite video signals on the respective lines by the trap circuits $10a-10e$ each having a trap frequency of 3.58 MHz, the luminance signal undergone a frequency separation is obtained for each scanning line.

By use of the subtraction circuits $13a-13c$, difference signals $|Y_{S1}-Y_{S3}|$, $|Y_{S2}-Y_{S4}|$, and $|Y_{S3}-Y_{S5}|$ can be obtained for each sampling point. The value of the difference signal $|Y_{S1}-Y_{S3}|$ is almost 0, whereas the values of the difference signals $|Y_{S2}-Y_{S4}|$ and $|Y_{S3}-Y_{S5}|$ values are positive. The subtraction circuits $13a-13c$ each output the absolute value of the difference signal.

The minimum value selecting circuit 14 selects the minimum value from the difference signals $|Y_{S1}-Y_{S3}|$, $|Y_{S2}-Y_{S4}|$, and $Y_{S3}-Y_{S5}|$ so as to control the switch 16. If the difference signal $|Y_{S1}-Y_{S3}|$ is minimum, the switch 16 selects a signal outputted from an adder $7d$; if the difference signal $|Y_{S2}-Y_{S4}|$ is minimum, a signal outputted from an adder $7e$ is selected; and if the difference signal $|Y_{S3}-Y_{S5}|$ is minimum, a signal outputted from an adder $7f$ is selected.

In the case of the state shown in FIG. 2, the value of the difference signal $|Y_{S1}-Y_{S3}|$ is the minimum value and thus the output signal $Y_1$ from the adder $7d$ is selected. The adder $7d$ forms a 2H type comb filter together with multipliers $4i-4k$ and 1H line memory units $2a-2b$. The digitized composite video signals $S_1-S_3$ are are multiplied by ¼, ½, and ¼ in the multipliers $4i-4k$, respectively and are added to each other by the adder $7d$. As a result, the $Y_1$ signal for the line $1-1$ is extracted. The $Y_1$ signal extraction is performed for all sampling points. Since the luminance signals associated with the lines $1-2$ to 1 are almost the same, the Y signal of the line $1-1$ can be replaced with the Y signal of line 1. In this fashion, the $Y_1$ signal which is equivalent to the $Y_{S3}$ signal of the line 1 and is subjected to the separation by the comb filter is extracted as the luminance signal of the line 1.

If the contour section S does not exist between the lines 1 and $1+1$, namely, the signals $Y_{S1}-Y_{S5}$ are almost the same, the values of the difference signals $|Y_{S1}-Y_{S3}|$, $|Y_{S2}-Y_{S4}|$, and $|Y_{S3}-Y_{S5}|$ are almost identical to each other. In this case, the values of the difference signals $|Y_{S1}-Y_{S3}|$, $|Y_{S2}-Y_{S4}|$, and $|Y_{S3}-Y_{S5}|$ are slightly different from each other depending on the magnitude of noise superimposed on the signals $Y_{S1}-Y_{S5}$; as a consequence, either one of the output signals of the adder $7d-7f$ is selected as the luminance signal of the line 1 by the switch 16. There does not exists any special restrictions for selecting the output signal.

If the contour section S exists between the lines $1+1$ and $1+2$, the signal outputted from the adder $7d$ or $7f$ is selected as the luminance signal of the line 1. If the contour section exists between the lines 1 and $1-1$, the output signal of the adder $7e$ is selected as the luminance signal of the line 1. The selected signal is the same as the luminance signal $Y_2$ of the line $1+1$. Moreover, if the contour section S exists between the lines $1-1$ and $1-2$, the output signal of the adder $7e$ or $7f$ is selected as the Y signal of the line 1.

The signal selection by use of the switch 16 is accomplished for each sampling point. In any cases, the output signal Y from the comb filter associated with the signal of the region in which the contour section is not found is outputted from the terminal 11.

If the contour section exists as shown by a dotted line T, the output signal from the adder $7e$ or $7f$ is selected as the Y signal of the line 1 at time $t_1$ and the output signal from the adder $7e$ is selected as the Y signal of the line 1 at time $t_2$. The output signal from the adder $7d$ is selected as the Y signal of the line 1 at time $t_3$, the output signal from the adder $7d$ or $7f$ is selected as the Y signal of the line 1 at time $T_4$, and the output signal from the adder $7d$, $7e$ or $7f$ is selected as the Y signal of the line 1 at time $T_5$.

Figure 3:
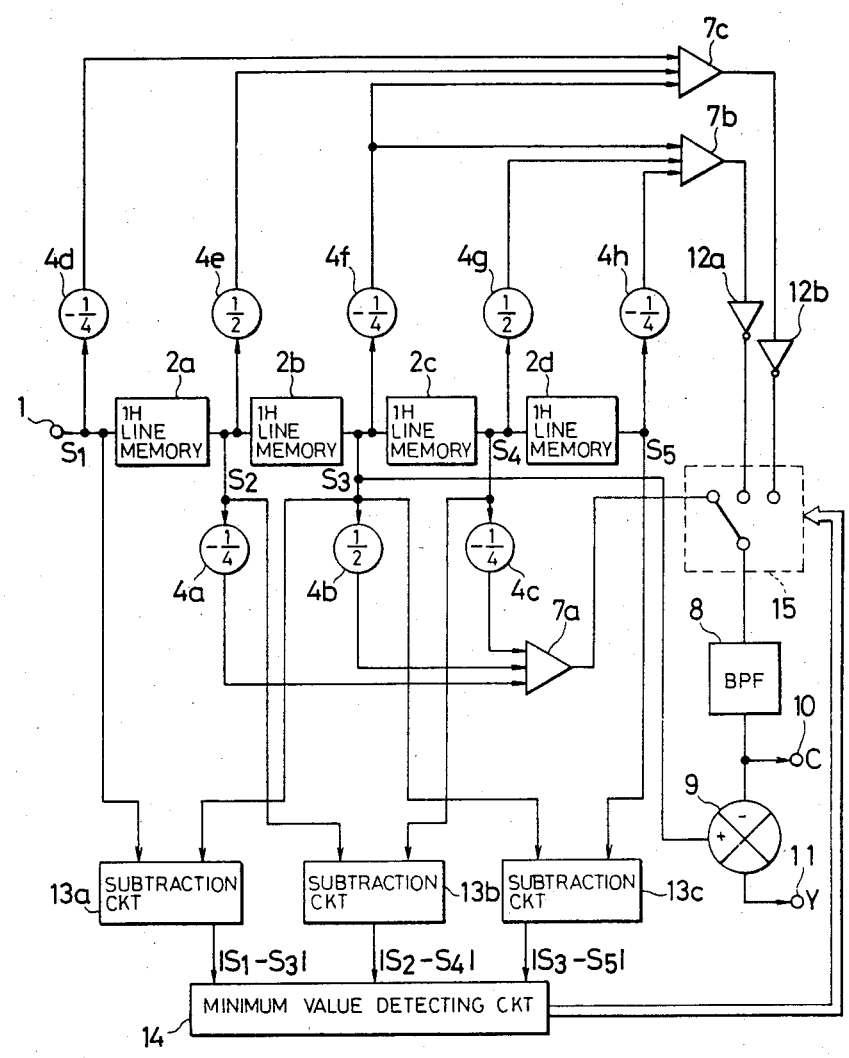
FIG. 3 is a block diagram depicting a first embodiment of the circuit for separating the luminance and chrominance signals according to the present invention.

FIG. 3 is a block diagram of the first embodiment of a circuit for separating the Y and C signals according to the present invention.

1H line memory units $2a-2b$ multipliers $4d-4f$ and an adder $7c$ constitute a first comb filter; 1H line memory units $2b-2c$, multipliers $4a-4c$, and an adder $7a$ form a second comb filter, and 1H line memory units $2c-2d$, multipliers $4f-4h$, and an adder $7b$ constitute a third comb filter. The output from the first comb filter (the adder $7c$) and the output from the third comb filter (the adder 7b) are linked to a switch 15 via inverters 12b and 12a, respectively; whereas the output from the second comb filter (the adder 7a) is directly linked to the switch 15.

An input signal $S_1$ of the 1H line memory 2a and an output signal $S_3$ from the 1H line memory 2b are fed to a subtraction circuit 13a, which then calculates the absolute value $|S_1-S_3|$ of the difference therebetween for each sampling point and then the result is delivered to a minimum value detecting circuit 14. An input signal $S_2$ of the 1H line memory 2b and an output signal $S_4$ from the 1H line memory 2c are fed to a subtraction circuit 13b which then calculates the absolute value $|S_2-S_4|$ of the difference therebetween for each sampling point and then the result is delivered to the minimum value detecting circuit 14. An input signal $S_3$ of the 1H line memory 2c and an output signal $S_5$ from the 1H line memory 2d are fed to a subtraction circuit 13c, which then calculates the absolute value $|S_3-S_5|$ of the difference therebetween for each sampling point and then the result is delivered to the minimum value detecting circuit 14.

The minimum value detecting circuit 14 compares the inputted three values, namely, the difference signals $|S_1-S_3|$, $|S_2-S_4|$, and $|S_3-S_5|$ to judge the minimum value and then sends the obtained minimum output to the switch 15.

If the minimum value detecting circuit 14 determines that the difference signal $|S_1-S_3|$ is minimum, the switch 15 selects the output signal from the inverter circuit 12b; if the difference signal $|S_2-S_4|$ is minimum, the output signal from the adder 7a is selected; and if $|S_3-S_5|$ is minimum, the output from the inverter circuit 12a is selected.

The signal selected by the switch 15 is supplied to a band-pass filter 8 and then is fed as the C signal to an output terminal 10.

In short, this circuit primarily comprises a first 2H type comb filter including the 1H line memory units 2a-2b, the second 2H type comb filter including the 1H type line memory units 2b-2c, and the third 2H type comb filter including the line memory units 2c-2d in which the strength or weakness of he correlation between video signals of the respective lines is judged by the subtraction circuits 13a-13c and the minimum value selecting circuit 14 so as to select one of the outputs from the three comb filters. The multipliers 4a-4h are used to multiply or weight the inputted signals by $-\frac{1}{4}$ or $\frac{1}{2}$. In the following paragraphs, the function of the circuit will be described in detail.

Figure 4:
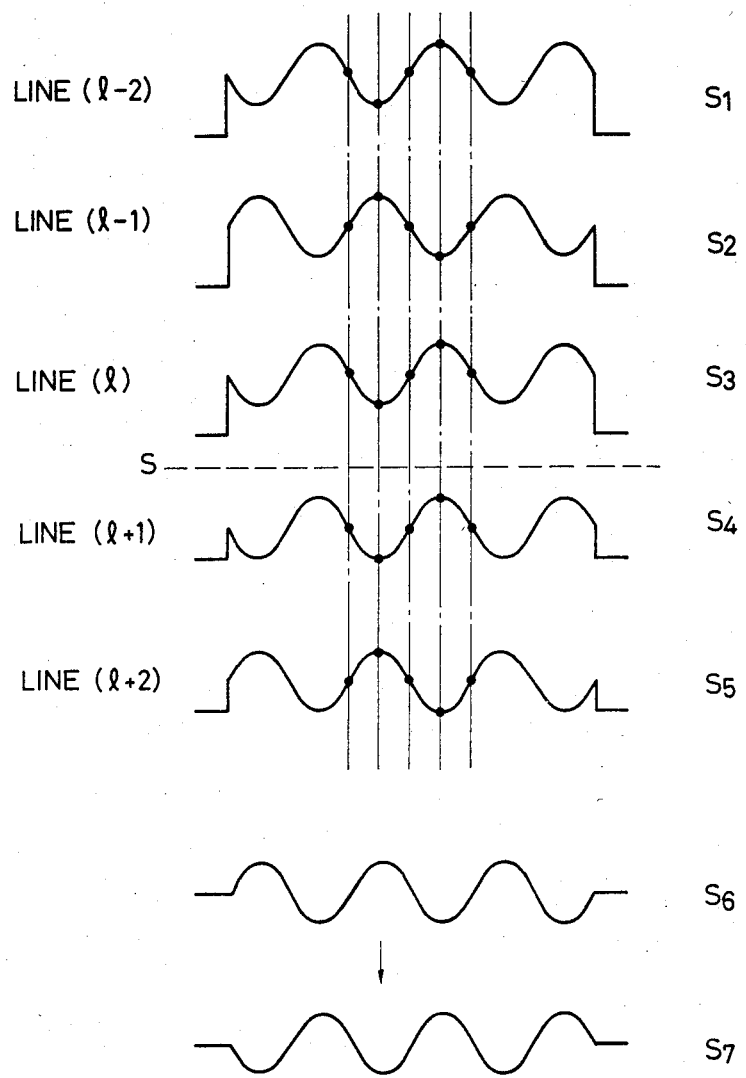
FIG. 4 is a schematic diagram demonstrating signals of the circuit shown in FIG. 3.

FIG. 4 is a schematic diagram demonstrating signals at the respective section of the circuit shown in FIG. 3. As shown in FIG. 4, a countour section indicated by a dotted line S exists between the lines 1 and 1+1 in the video signals from the line 1−2 to the line 1+2. The color and luminance of the image are changed at this contour section S and there exists the complementary relationship between the color of the line 1 and that of the line 1+1. Solid points denote the sampling points. Also in FIG. 4, the signals $S_1$-$S_7$ are represented in the analog fashion; however, these signals are actually digitized.

Assume that the C signal is separated from the video signal $S_3$ on the line 1. $S_1$-$S_5$ indicate signals related to the lines 1−2 to 1+2, respectively. These signals each are different in time by 1H and are simultaneously obtained from the 1H line memory units 2a-2d, respectively of FIG. 3.

The subtraction circuits 13a-13c are used to calculate the difference signals $|S_1-S_3|$, $|S_2-S_4|$, and $|S_3-S_5|$ as described above. Since the contour section exists at the location indicated by the dotted line S, the lines 1'2, 1—1, and 1 are in the same (first) region having the same color and luminance and hence the signals $S_1$-$S_3$ have a strong correlation therebetween; on the other hand, the lines 1+1 and 1+2 from a second region having the different color or luminance as that of the first region. Consequently, for the signals $S_1-S_3$ and between the signals $S_2-S_3$, the luminance signals are almost the same but the phase of the chrominance signal is inverted.

That is, the luminance signals and the phases of the chrominance signals are almost the same between the signals $S_1$ and $S_3$, resulting in a strong correlation therebetween. The value of the difference signal $|S_1-S_3|$ is in the neighborhood of 0. The signals $S_2$ and $S_3$ belong to the first region, whereas the signals $S_4$ and $S_5$ belong to the second region; consequently, the signals $S_2-S_3$ and the signals $S_4-S_5$ have a weak correlation, namely, the values of the difference signals $|S_2-S_4|$ and $|S_3-S_5|$ are positive.

The minimum value detecting circuit 14 selects the minimum value from the output signals, namely, the difference signals $|S_1-S_3|$, $|S_2-S_4|$, and $|S_3-S_5|$ from the subtraction circuits 13a-13c, respectively, thereby controlling the switch 15. For example, if the difference signal $S_1-S_3|$ is minimum, the signal delivered via the inverter 12b from the adder 7c is selected by the switch 15; if the difference signal $|S_2-S_4|$ is minimum, the output signal from the adder 7a is selected by the switch 15; and if the difference signal $|S_3-S_5|$ is minimum, the signal delivered via the inverter circuit 12a from the adder 7b is selected by the switch 15.

Figure 7:
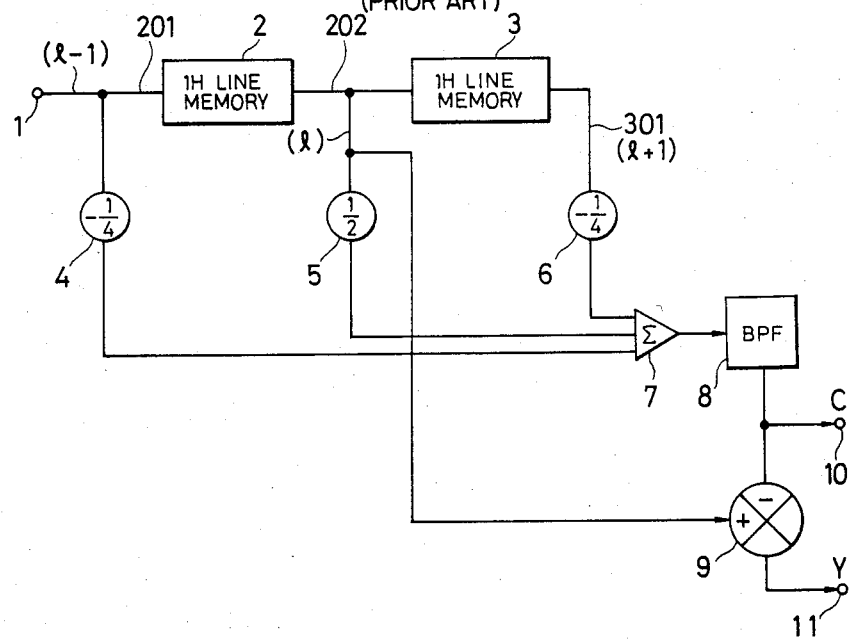
FIG. 7 is a block diagram depicting the conventional circuit for separating the luminance and chrominance signals.
Figure 8:
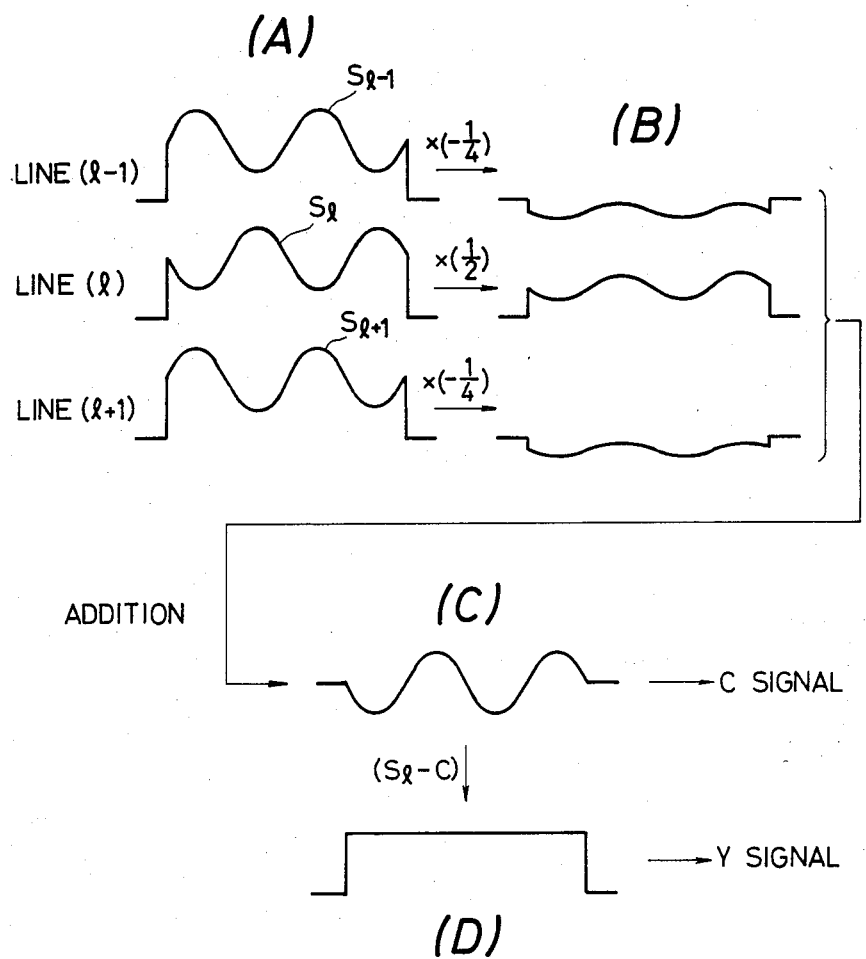
FIGS. 8-10 are schematic diagrams illustrating the respective sections of FIG. 7.
Figure 9:
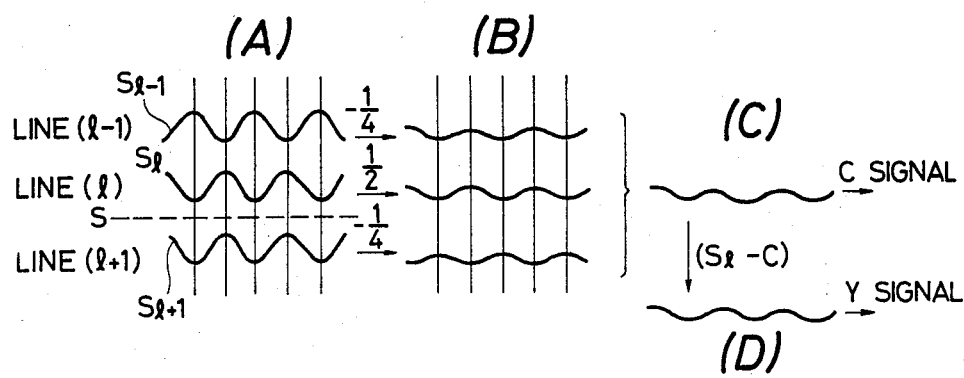
Figure 10:
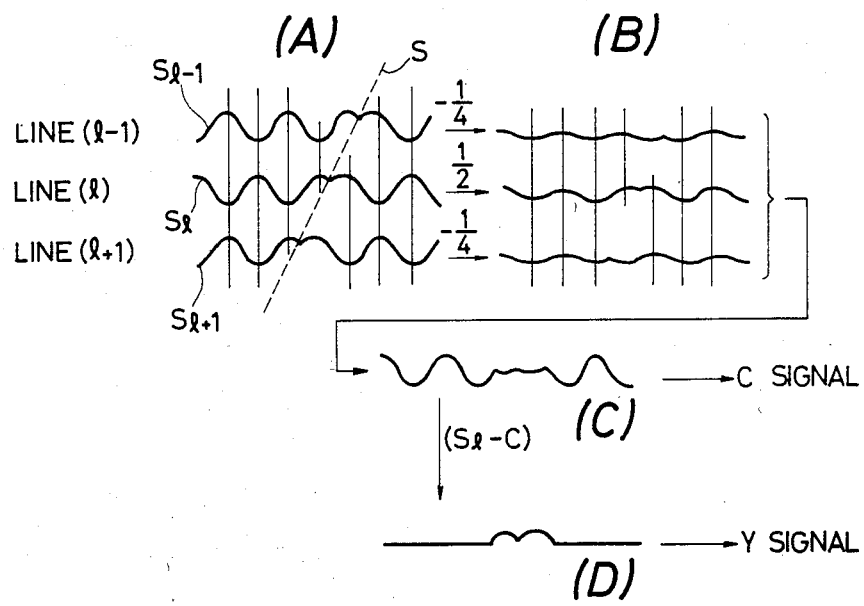

In FIG. 4 since $S_1-S_3|$ is the minimum value, the signal outputted from the adder 7c is selected via the inverter 12b. The adder 7c constitutes a 2H type comb filter together with the multipliers 4d-4f and the 1H line memory units 2a-2b, and hence in the completely same fashion as for the circuit shown in FIG. 7, the C signal having a small amount of DC component is selected from the video signal of the line 1—1 and is then outputted. Naturally, if the signals $S_1$ and $S_2$ have the same luminance, there does not exist the DC signal. This is demonstrated as a waveform $S_6$ in FIG. 2.

The inverter circuit 12b inverts the phase of the signal $S_6$ and the inverted output signal is passed through the band-pass filter 8 so as to remove the DC component therefrom, thereby obtaining the C signal for the video signal of the line 1 from the C signal of the line 1—1 (signal $S_7$).

If the contour section S exists between the lines 1+1 and 1+2, the output signal from the adder 7a or 7c is selected by the switch 15. If the contour section S exists between the lines 1—1 and 1, the output signal from the adder 7b is selected, whereas if the contour section S exists between the lines 1-2 and 1—1, the output signal from the adder 7a or 7b is selected by the switch 15. In any cases, a chrominance signal filtered through the comb filter is selected from the composite video signal not including the contour section S.

The luminance (Y) signal is obtained at the output terminal 11 of the subtraction circuit 9.

Figure 5:
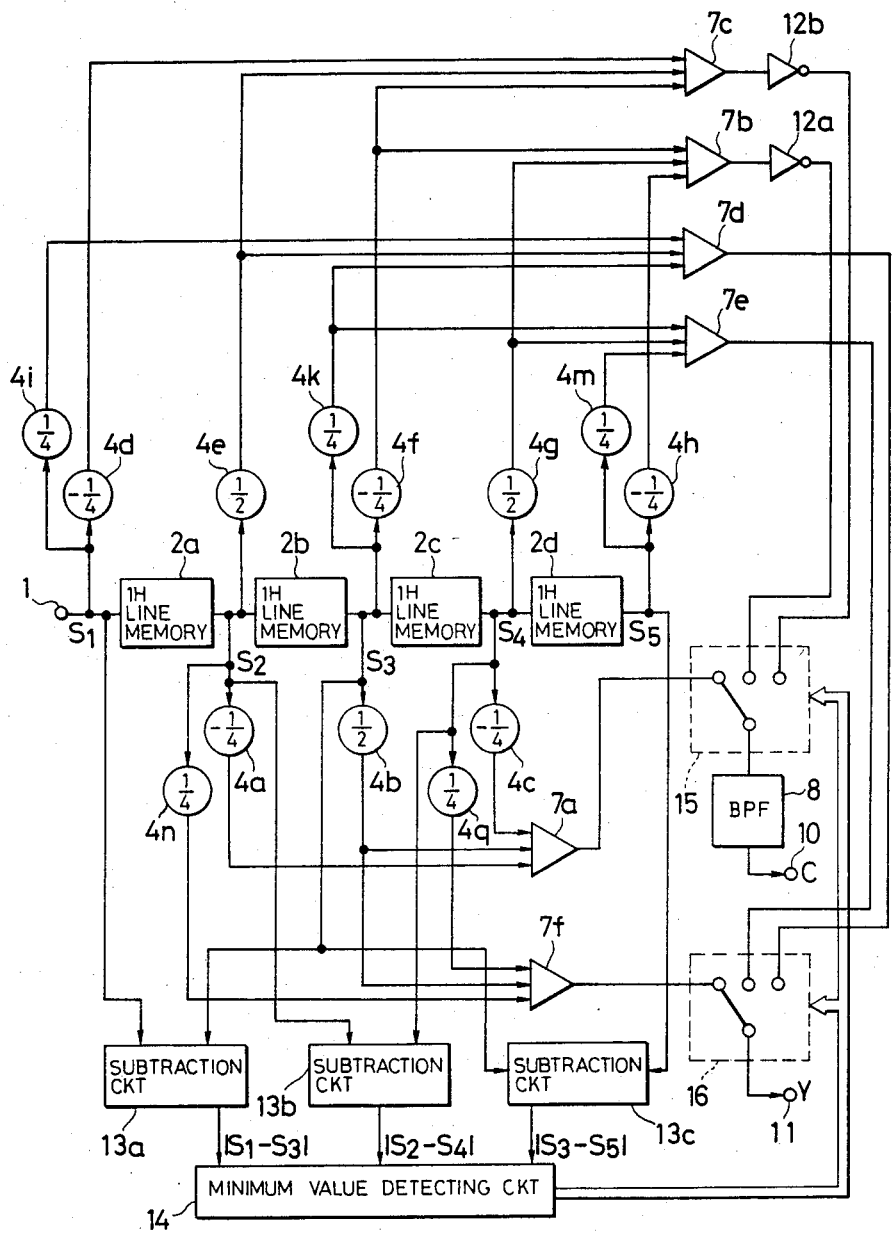
FIG. 5 is a block diagram of a second embodiment of the circuit for separating the luminance and chrominance signals according to the present invention.

FIG. 5 is a block diagram illustrating another embodiment of the circuit for separating the luminance and chrominance signals according to the present invention.

This embodiment is basically implemented by combining the circuit of FIG. 3 for separating the chrominance (C) signal and the circuit of FIG. 1 for separating the luminance (Y) signal. The selection of the comb filters is accomplished in the same fashion as that applied to the circuit for separating the C signal.

That is, the subtraction circuits 13a-13c calculate the difference signals $|S_1-S_3|$, $|S_2-S_4|$, and $|S_3-S_5|$ between the composite video signals $S_1-S_5$ for the respective scanning lines. The minimum value detecting circuit 14 detects the difference signal having the minimum value or having the strongest correlation among these difference signals. Since the signals $S_1-S_5$ are composite video signals, the strength or weakness of the correlation can be judged from the difference signals $|S_1-S_3|$, $|S_2-S_4|$, and $|S_3-S_5|$ for the Y and C signals.

Consequently, if the difference signal $|S_1-S_3|$ is is minimum, the output signals from the inverter 12b and the adder 7d are selected; if the difference signal $|S_2-S_4|$ is minimum, the output signals from the added 7a-7f are selected; and if $|S_3-S_5|$ is minimum, the output signals from the inverter circuit 12a and the adder 7e are selected. As a result, the C and Y signals are obtained at the terminals 10 and 11, respectively. As described above, in the same fashion as for the circuits of FIGS. 1 and 3, the luminance and chrominance signals are separated in a region having a strong correlation, the obtained signal is substituted in the contour section of the image, which enables to appropriately separate the luminance and chrominance signals.

In the circuits of FIGS. 1, 3, and 5, the signals $S_1-S_5$ are preferably digitized; however, these signals may be analog signals. If the signals $S_1-S_5$ are digital signals, an analog-digital (A/D) converter is natually disposed before the terminal 1 and a digital-analog (D/A) converter is disposed after the terminals 10 and 11. The multipliers 4i, 4k, 4m, 4n, and 4g are used to weight the input signal with ¼.

In FIGS. 3 and 5, the subtraction circuits 13a-13c calculate the absolute values of the difference signals.

In FIGS. 3 and 5, if the weight of the multipliers (weight circuits) 4d, 4f, and 4h is ¼ and the weight of the multipliers (weight circuits) 41 and 4g is ½, the inverters 12a and 12b are unnecessary.

Next, a concrete circuit configuration of the minimum value detecting circuit 14 will be described.

Figure 6:
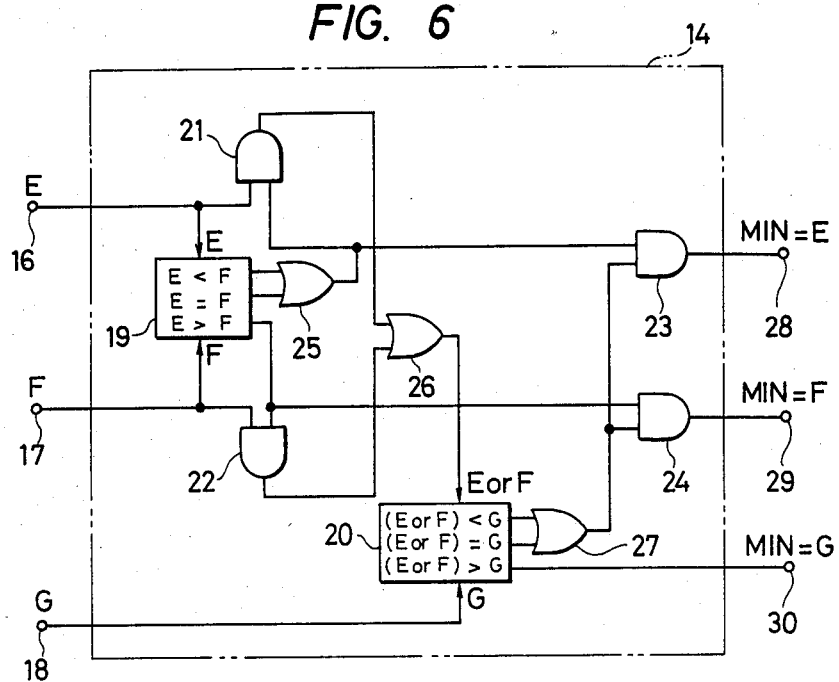
FIG. 6 is a block diagram illustrating a minimum value detecting circuit.

FIG. 6 is a schematic circuit diagram illustrating the minimum value selecting circuit.

The difference signals $|Y_{S1}-Y_{S3}|$, $|Y_{S2}-Y_{S4}|$, and $|Y_{S3}-Y_{S5}|$ of FIG. 1 are substituted for signals E, F, and G, respectively, and the control signals to the switch 15 are supplied from the terminals 28-30. An input datum E is compared with an input datum F. The data E and F are inputted to the comparator 19, which in turn checks to determine whether or not the datum E is greater than the datum F. According to the result, a high-level (H) signal is delivered to the corresponding terminal (E<F, E=F, or E>F.)

First, the datum E supplied to the terminal 16 and the datum F supplied to the terminal 17 are compared in the comparator 19.

For E<F or E=F, the AND circuit 21 is opened through the OR circuit 25, which causes the datum E to be fed via the OR circuit 26 to the comparator 20, which then compares the datum E with the datum G. If E>G, the terminal 30 is set to the high level to indicate that the datum g is minimum. If E<G or E=G, the AND circuit 23 is opened via the OR circuit 27, which causes the terminal 28 to be set to the high level to indicate that the datum E is minimum. If E>F, the datum F is delivered through the AND circuit 22 and the OR circuit 26 to the compartor 20, which in turn compares the datum F with the datum G. If F>G, the terminal 30 is set to the high level (H) to indicate the data is minimum. If F<G or F=G, the AND circuit 23 is opened via the OR circuit 27, which causes the terminal 29 to be set to the high level (H) to indicate that the datum F is minimum.

As described above, the circuit for separating the luminance and chrominance signals according to the present invention is capable of separating the luminance and chrominance signals, even in a case where a contour section exists in the video signal, by use of a signal not including the contour section. The separated luminance signal does not include the chrominance signal and the separated chrominance signal does not include the luminance signal.

We claim:

1. A circuit having comb filters for separating a luminance signal or a chrominance signal from a composite signal of TV signals in the NTSC system comprising:
   (a) signal delay means including first, second, third, and fourth line memory units each being sequentially connected in series,
      a delay time of each said line memory unit being identical to a horizontal scanning period, and
      said first line memory unit being connected to an input terminal to which the composite signal is supplied;
   (b) a first comb filter including:
      a first weighting circuit connected to said input terminal for receiving the composite video signal from said input terminal and for weighting the composite video signal;
      a second weighting circuit connected to said first line memory unit for receiving a first delay signal therefrom and for weighting said first delay signal;
      a third weighting circuit connected to said second line memory unit for receiving a second delay signal therefrom and for weighting said second delay signal; and
      a first adder circuit connected to said first, second, and third weighting circuits for adding said weighted composite signal and said weighted first and second delay signals,
      said first comb filter forming a comb filter together with said first and second line memory units of said signal delay means for generating a first chrominance signal;
   (c) a second comb filter comprising;
      a fourth weighting circuit connected to said first line memory unit for receiving a first delay signal therefrom and for weighting said first delay signal;
      a fifth weighting circuit connected to said second line memory unit for receiving a second delay signal therefrom and for weighting said second delay signal;
      a sixth weighting circuit connected to said third line memory unit for receiving a third delay signal and for weighting said third delay signal; and
      a second adder circuit connected to said fourth, fifth, and sixth weighting circuits for receiving the first, second, and third delay signals therefrom and for adding the weighted first, second, and third delay signals, said second comb filter forming a comb filter together with said second and third line memory units of said delay means for generating a second chrominance signal;

(d) a third comb filter including:
a seventh weighting circuit connected to said third line memory unit for receiving a third delay signal therefrom and for weighting said third delay signal;
an eighth weighting circuit connected to said fourth line memory unit for receiving a fourth delay signal therefrom and for weighting said fourth delay signal; and
a third adder circuit connected to the seventh and eighth weighting circuits and the third weighting circuit of said first comb filter for adding the weighted second, third, and fourth delay signals,
said third comb filter forming a comb filter together with said third and fourth line memory units of said delay means for generating a third chrominance signal;

(e) a group of subtraction circuits including first, second, and third subtraction circuits in which:
said first subtraction circuit is connected to said input terminal and said second line memory unit for receiving the composite video signal from said input terminal and for receiving said second delay signal from said second line memory unit, thereby generating a first difference signal between said composite video signal and said second delay signal;
said second delay circuit is connected to said first line memory unit and said third line memory unit for receiving a first delay signal from said first line memory unit and for receiving a third delay signal from said third line memory unit, thereby generating a second difference signal between said first delay signal and said third delay signal; and
said third subtraction circuit is connected to said second and fourth line memory units for receiving a second delay signal from said second line memory unit and for receiving a fourth delay signal from said fourth line memory unit, thereby generating a third difference signal between said second delay signal and said fourth delay signal;

(f) a minimum value detecting circuit connected to the first, second, and third subtraction circuits of said subtraction circuit group for receiving the first, second, and third difference signals from said first, second, and third subtraction circuits, respectively, said minimum value detecting circuit generating a first output signal when the value of the first difference signal is less than the values of the third and second difference signals, generating a second output signal when the value of the second difference signal is less than the values of the first and third difference signals, and generating a third output signal when the value of the third difference signal is less than the values of the first and second difference signals;

(g) switch means connected to said first, second, and third comb filters for receiving the first, second and third chrominance signals therefrom, said switch means being further connected to said minimum value detecting circuit for receiving said first, second, and third output signals therefrom,
said switch means selecting and outputting the first chrominance signal when the first output signal is supplied from said minimum value detecting circuit, selecting and outputting the second chrominance signal when the second output signal is supplied, and selecting and outputting the third chrominance signal when the third output signal is supplied; and (h) a band-pass filter connected to said switch means for receiving therefrom the first, second, or third chrominance signal selected by said switch means and for filtering said chrominance signal, thereby supplying the filtered chrominance signal to an output terminal.

2. A circuit according to claim 1 wherein the composite signal supplied to the input terminal connected to said signal delay means is a digitized signal.

3. A circuit according to claim 1 wherein:
the weight of the first, third, fourth, sixth, and eighth weighting circuits is $-\frac{1}{4}$;
the weight of the second, fifth, and seventh weighting circuits is $\frac{1}{2}$;
a first inverter is connected between said first comb filter and said first adder circuit; and
a second inverter is connected between said third comb filter and said third adder circuit.

4. A circuit having comb filters for separating a luminance signal or a chrominance signal from a composite signal of TV signals in the NTSC system comprising:
(a) signal delay means including first, second, third, and fourth line memory units each being sequentially connected in series,
a delay time of each said line memory unit being identical to a horizontal scanning pariod, and said first line memory unit being connected to an input terminal to which the composite signal is supplied;

(b) a first comb filter including;
a first weighting circuit c nnected to said input terminal for receiving the composite video signal from said input terminal and for weighting the composite video signal;
a second weighting circuit connected to said first line memory unit for receiving a first delay signal therefrom and for weighting said first delay signal;
a third weighting circuit connected to said second line memory unit for receiving a second delay signal therefrom and for weighting said second delay signal; and
a first adder circuit connected to said first, second, and third weighting circuits for adding said weighted composite signal and said weighted first and second delay signals,
said first comb filter forming a comb filter together with said first and second line memory units of said signal delay means for generating a first chrominance signal;

(c) a second comb filter comprising:
a fourth weighting circuit connected to said first line memory unit for receiving a first delay signal therefrom and for weighting said first delay signal;
a fifth weighting circuit connected to said second line memory unit for receiving a second delay signal therefrom and for weighting said second delay signal;

a sixth weighting circuit connected to said third line memory unit for receiving a third delay signal and for weighting said third delay signal; and a second adder circuit connected to said fourth, fifth, and sixth weighting circuits for receiving the first, second, and third delay signals therefrom and for adding the weighted first, second, and third delay signals, said second comb filter forming a comb filter together with said second and third line memory units of said delay means for generating a second chrominance signal;

(d) a third comb filter including:

a seventh weighting circuit connected to said third line memory unit for receiving a third delay signal therefrom and for weighting said third delay signal;

an eighth weighting circuit connected to said fourth line memory unit for receiving a fourth delay signal therefrom and for weighting said fourth delay signal; and a third adder circuit connected to the seventh and eighth weighting circuits and the third weighting circuit of said first comb filter for adding the weighted second, third, and fourth delay signals, said third comb filter forming a comb filter together with said third and fourth line memory units of said delay means for generating a third chrominance signal;

(e) a group of subtraction circuits including first, second, and third subtraction circuits in which:

said first subtraction circuit is connected to said input terminal and said second line memory unit for receiving the composite video signal from said input terminal and for receiving said second delay signal from said second line memory unit, thereby generating a first difference signal between said composite video signal and said second delay signal;

said second delay circuit is connected to said first line memory unit and said third line memory unit for receiving a first delay signal from said first line memory unit and for receiving a third delay signal from said third line memory unit, thereby generating a second difference signal between said first delay signal and said third delay signal; and said third subtraction circuit is connected to said second and fourth line memory units for receiving a second delay signal from said second line memory unit and for receiving a fourth delay signal from said fourth line memory unit, thereby generating a third difference signal between said second delay signal and said fourth delay signal;

(f) a minimum value detecting circuit connected to the first, second, and third subtraction circuits of said subtraction circuit group for receiving the first, second, and third difference signals from said first, second, and third subtraction circuits, respectively, said minimum value detecting circuit generating a first output signal when the value of the first difference signal is less than the values of the third and second difference signals, generating a second output signal when the value of the second difference signal is less than the values of the first and third difference signals, and generating a third output signal when the value of the third difference signal is less than the values of the first and second difference signals;

(g) switch means connected to said first, second, and third comb filters for receiving the first, second and third chrominance signals therefrom, said switch means being further connected to said minimum value detecting circuit for receiving said first, second, and third output signals therefrom, said switch means selecting and outputting the first chrominance signal when the first output signal is supplied from said minimum value detecting circuit, selecting and outputting the second chrominance signal when the second output signal is supplied, and selecting and outputting the third chrominance signal when the third output signal is supplied;

(h) a band-pass filter connected to said switch means for receiving therefrom the first, second, or third chrominance signal selected by said switch means and for filtering said chrominance signal, thereby supplying the filtered chrominance signal to an output terminal; and (i) subtraction means connected to the second line memory unit of said signal delay means and said band-pass filter for subtracting the chrominance signal filtered through said band-pass filter from said second delay signal, thereby generating a luminance signal.

5. A circuit according to claim 4 wherein the composite signal supplied to the input terminal connected to said signal delay means is a digitized signal.

6. A circuit according to claim 4 wherein:

the weight of the first, third, fourth, sixth, and eighth weighting circuits is $-\frac{1}{4}$;

the weight of the second, fifth, and seventh weighting circuits is $\frac{1}{2}$;

a first inverter is connected between said first comb filter and said first adder circuit; and a second inverter is connected between said third comb filter and said third adder circuit.

7. A circuit having comb filters for separating a luminance signal or a chrominance signal from a composite signal of TV signals in the NTSC system comprising:

(a) signal delay means including first, second, third, and fourth line memory units each being sequentially connected in series, a delay time of each said line memory unit being identical to a horizontal scanning period, and said first line memory unit being connected to an input terminal to which the composite signal is supplied;

(b) a first comb filter including:

a first weighting circuit connected to said input terminal for receiving the composite video signal from said input terminal and for weighting the composite video signal;

a second weighting circuit connected to said first line memory unit for receiving a first delay signal therefrom and for weighting said first delay signal;

a third weighting circuit connected to said second line memory unit for receiving a second delay signal therefrom and for weighting said second delay signal; and a first adder circuit connected to said first, second, and third weighting circuits for adding said weighted composite signal and said weighted first and second delay signals, said first comb filter forming a comb filter together with said first and second line memory units of said signal delay means for generating a first chrominance signal;

(c) a second comb filter comprising:
a fourth weighting circuit connected to said first line memory unit for receiving a first delay signal therefrom and for weighting said first delay signal;
a fifth weighting circuit connected to said second line memory unit for receiving a second delay signal therefrom and for weighting said second delay signal;
a sixth weighting circuit connected to said third line memory unit for receiving a third delay signal and for weighting said third delay signal; and
a second adder circuit connected to said fourth, fifth, and sixth weighting circuits for receiving the first, second, and third delay signals therefrom and for adding the weighted first, second, and third delay signals,
said second comb filter forming a comb filter together with said second and third line memory units of signal;

(d) a third comb filter including:
a seventh weighting circuit connected to said third line memory unit for receiving a third delay signal therefrom and for weighting said third delay signal;
an eighth weighting circuit connected to said fourth line memory unit for receiving a fourth delay signal therefrom and for weighting said fourth delay signal; and
a third adder circuit connected to the seventh and eighth weighting circuits and the third weighting circuit of said first comb filter for adding the weighted second, third, and fourth delay signals,
said third comb filter forming a comb filter together with said third and fourth line memory units of said delay means for generating a third chrominance signal;

(e) a group of subtraction circuits including first, second, and third subtraction circuits in which:
said first subtraction circuit is connected to said input terminal and said second line memory unit for receiving the composite video signal from said input terminal and for receiving said second delay signal from said second line memory unit, thereby generating a first difference signal between said composite video signal and said second delay signal;
said second delay circuit is connected to said first line memory unit and said third line memory unit for receiving a first delay signal from said first line memory unit and for receiving a third delay signal from said third line memory unit, thereby generating a second difference signal between said first delay signal and said third delay signal; and
said third subtraction circuit is connected to said second and fourth line memory units for receiving a second delay signal from said second line memory unit and for receiving a fourth delay signal from said fourth line memory unit, thereby generating a third difference signal between said second delay signal and said fourth delay signal;

(f) a minimum value detecting circuit connected to the first, second, and third subtraction circuits of said subtraction circuit group for receiving the first, second, and third difference signals from said first, second, and third subtraction circuits, respectively, said minimum value detecting circuit generating a first output signal when the value of the first difference signal is less than the values of the third and second difference signals, generating a second output signal when the value of the second difference signal is less than the values of the first and third difference signals, and generating a third output signal when the value of the third difference signal is less than the values of the first and second difference signals;

(g) first switch means connected to said first, second, and third comb filters for receiving the first, second and third chrominance signals therefrom, said first switch means being further connected to said minimum value detecting circuit for receiving said first, second, and third output signals therefrom,
said first switch means selecting and outputting the first chrominance signal when the first output signal is supplied from said minimum value detecting circuit, selecting and outputting the second chrominance signal when the second output signal is supplied, and selecting and outputting the third chrominance signal when the third output signal is supplied;

(h) a band-pass filter connected to said first switch means for receiving therefrom the first, second, or third chrominance signal selected by said first switch means and for filtering said chrominance signal, thereby suppling the filtered chrominance signal to an output terminal;

(i) a fourth comb filter including:
a ninth weighting circuit connected to said input terminal for receiving the composite video signal therefrom and for weighting the composite video signal;
a tenth weighting circuit connected to said second line memory unit for receiving a second delay signal therefrom and for weighting the second delay signal; and
a fourth adder circuit connected to said ninth and tenth weighting circuits and the second weighting circuit of said first comb filter for adding the output signals from said second, ninth, and tenth weighting circuits,
said fourth comb filter forming a comb filter together with the first and second line memory units of said signal delay means for generating a first luminance signal;

(j) a fifth comb filter including:
a 11th weighting circuit connected to said first line memory unit for receiving a first delay signal therefrom and for weighting the first delay signal;
a 12th weighting circuit connected to said third line memory unit for receiving a third delay signal therefrom and for weighting the third delay signal; and
a fifth adder circuit connected to said 11th and 12th weighting circuits and the fifth weighting circuit of said second comb filter for adding the output signals from said fifth, 11th, and 12th weighting circuits, said fifth comb filter forming a comb filter together with the second and third line memory units of said signal delay means for generating a second luminance signal;

(k) a sixth comb filter including:
a 13th weighting circuit connected to said fourth line memory unit for receiving a fourth delay signal therefrom and for weighting the fourth delay signal and a sixth adder circuit connected to said 13th weighting circuit, the tenth weighting circuit of said fouth comb filter, and the seventh weighting circuit of said third comb filter for adding the output signals from said seventh, 10th, and 14th weighting circuits, said sixth comb filter forming a comb filter together with the third and third line memory units of said signal delay means for generating a third luminance signal; and (1) second switch means connected to said fourth, fifth, and sixth comb filters for receiving the first, second and third chrominance signals therefrom, said first switch means being further connected to said minimum value detecting circuit for receiving said first, second, and third output signals therefrom, said second switch means selecting and outputting the first chrominance signal when the first output signal is supplied from said minimum value detecting circuit, selecting and outputting the second chrominance signal when the second output signal is supplied, and selecting and outputting the third chrominance signal when the third output signal is supplied.

8. A circuit according to claim 7 wherein the composite signal supplied to the input terminal connected to said signal delay means is a digitized signal.

9. A circuit according to claim 7 wherein:
the weight of the first, third, fourth, sixth, and eighth weighting circuits is $-\frac{1}{4}$;

the weight of the second, fifth, and seventh weighting circuits is $\frac{1}{2}$;

the weight of said ninth, tenth, 11th, 12th, and 13th weighting circuit is $\frac{1}{4}$;

a first inverter is connected between said first comb filter and said first adder circuit; and a second inverter is connected between said third comb filter and said third adder circuit.

* * * * *